(12) United States Patent
Champion et al.

(10) Patent No.: US 7,167,434 B2
(45) Date of Patent: Jan. 23, 2007

(54) STORAGE DEVICE HAVING A PROBE WITH A FIRST PLATE THAT COOPERATES WITH A SECOND PLATE TO PROVIDE A VARIABLE CAPACITANCE

(75) Inventors: Corbin L. Champion, Pullman, WA (US); Sarah M. Brandenberger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 10/796,631

(22) Filed: Mar. 9, 2004

(65) Prior Publication Data

US 2005/0201256 A1  Sep. 15, 2005

(51) Int. Cl.
*G11B 7/00* (2006.01)
(52) U.S. Cl. ...................................... 369/126
(58) Field of Classification Search ............ 369/44.12, 369/275.3, 100, 126
See application file for complete search history.

(56) References Cited

U.S. PATENT DOCUMENTS 4,489,278 A * 12/1984 Sawazaki ................... 324/457

| | | | |
|---|---|---|---|
| 5,345,815 A | 9/1994 | Albrecht et al. | |
| 5,835,477 A | 11/1998 | Binnig et al. | |
| 5,856,967 A | 1/1999 | Mamin et al. | |
| 6,233,206 B1 | 5/2001 | Hamann et al. | |
| 6,370,107 B1 | 4/2002 | Hosaka et al. | |
| 6,473,361 B1 | 10/2002 | Chen et al. | |

OTHER PUBLICATIONS

Vettiger and Binnig, Scientific American, "The Nanodrive Project," pp. 47-51, 53 (Jan. 2003).

* cited by examiner

*Primary Examiner*—Nabil Hindi

(57) ABSTRACT

A storage device includes a storage medium and a probe having a tip and a first plate. The tip of the probe is adapted to form a dent in the storage medium to represent a state of a data bit. The storage device also includes a second plate, where the first plate and second plate cooperate to form a variable capacitance that varies between different capacitance values depending on whether the tip of the probe is engaged in the dent.

26 Claims, 4 Drawing Sheets

# STORAGE DEVICE HAVING A PROBE WITH A FIRST PLATE THAT COOPERATES WITH A SECOND PLATE TO PROVIDE A VARIABLE CAPACITANCE

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Traditionally, for a probe to read data bits from a storage medium in which dents have been formed, the probe is heated to a predetermined temperature, such as 400° C. When a scanning tip of the probe encounters and enters a dent, the tip transfers heat to the storage medium, which causes the temperature of the probe tip to fall, which in turn causes electrical resistance of the tip to fall. The fall in resistance, which is a relatively tiny amount, is detected by detection circuitry to determine the state of the data bit. Another technique for detecting the state of a data bit involves the use of a piezoresistive element in the probe. When the probe tip encounters a dent, the cantilever of the probe deflects, which causes the resistance of the piezoresistive element to change. The change in resistance is measured by detection circuitry. However, with the above techniques, the variation in resistance due to the presence and absence of a dent is relatively small. As a result, reliable detection of data bits may not always be possible due to the presence of noise and other factors. Also, the speed at which read operations can be performed is also reduced due to weak read signals in such probe-based storage devices.

DETAILED DESCRIPTION

Figure 1:
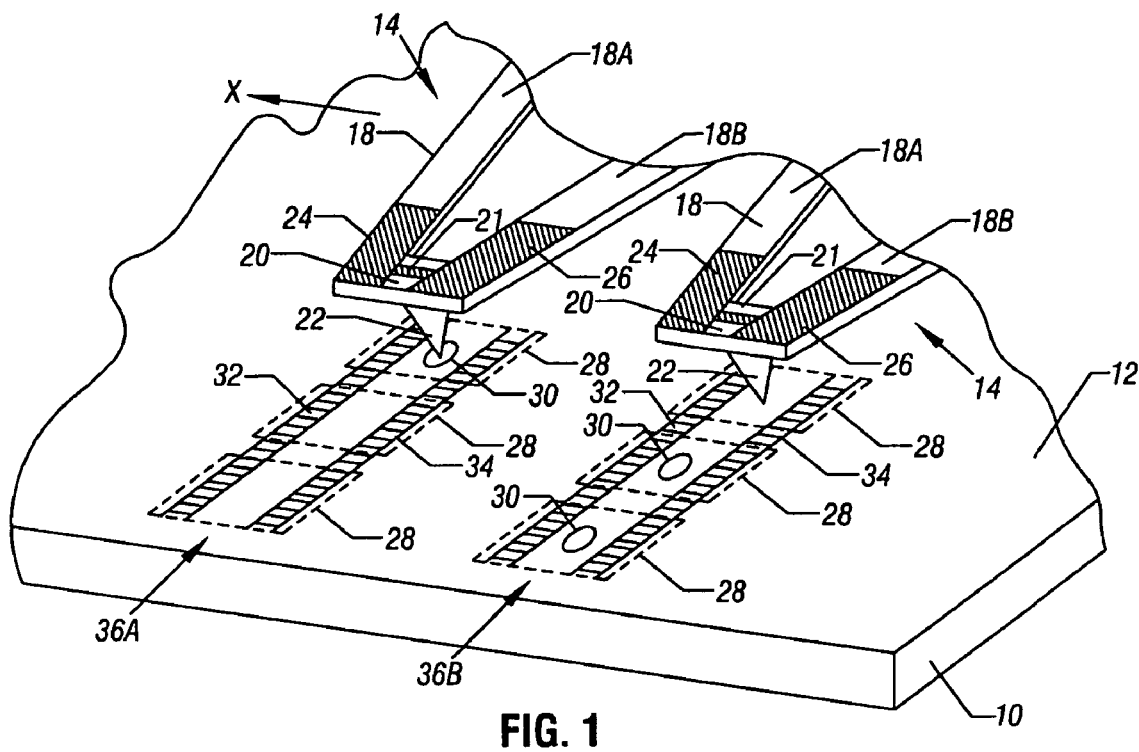
FIG. 1 illustrates a portion of a probe-based storage device that includes probes for detecting states of storage cells based on capacitance values of variable capacitances, in accordance with an embodiment of the invention.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

The storage medium has a storage surface 12 on which perturbations can be formed by tips 22 of respective probes 14. The tip 22 of each probe 14 is attached to and extends outwardly from a cantilever 18 of each probe 14. Although two probes 14 are illustrated in FIG. 1, only one probe or more than two probes can be used in other embodiments. According to some embodiments, each probe 14 is a very small probe (on the order of micrometers, nanometers, or even smaller) that is built using nanotechnology techniques. Such a probe is referred to as a microscopic probe or a nanotechnology probe.

In the implementation depicted in FIG. 1, each cantilever 18 has two sections 18A and 18B that join at an end portion 20. The probe tip 22 protrudes from the end portion 20 of the cantilever 18. In the proximity of the end portion 20, two plates 24 and 26 are also provided on the cantilever 18. The plate 24 is arranged on a portion of the cantilever section 18A, while the plate 26 is arranged generally on a portion of the cantilever section 18B. The plates 24 and 26 are electrically conductive plates that can be formed of metal, doped silicon, polysilicon, and other electrically conductive materials. The plates 24 and 26 are spaced apart along the horizontal plane in which the probe 14 generally lies (indicated as the X direction in FIG. 1).

An electrically conductive trace provided on the end portion 20 of the cantilever 18 electrically connects the plates 24 and 26. The first plate 24 on the probe 14 cooperates with a spaced apart third plate 32 to form a first variable capacitance that is made up of the plates 24 and 32 in conjunction with a dielectric (such as air) between the plates 24 and 32. Instead of air, some other type of gas can be provided in the storage device to form the dielectric between the plates 24 and 32. Also, if the plates 24, 32 are provided underneath a layer of the storage substrate 10, then the dielectric also includes the layer of storage substrate 10.

In similar fashion, the second plate 26 on the probe 14 cooperates with a fourth plate 34 to form another variable capacitance. The plates 32 and 34 can be arranged in a number of different positions. For example, in a first arrangement, the plates 32 and 34 can be formed on the storage surface 12 of the storage substrate 10. In a second arrangement, the plates 32 and 34 are buried below a layer of storage substrate 10. In the second arrangement, the storage medium (provided by the layer of the storage substrate 10) is positioned between the probe 14 and a plane containing the plates 32 and 34. In a third arrangement, the storage plates 32 and 34 are provided above the probe 14. In the third arrangement, the probe 14 is positioned between the storage medium and a plane containing the plates 32 and 34.

As depicted in FIG. 1, the plates 32 and 34 are continuous plates that extend along a given direction of the storage substrate 10. In another embodiment, each plate 32 or 34 can be separated into discrete segments, with each segment associated with a respective storage cell 28.

FIG. 1 shows an array of storage cells 28. Note that a large number of storage cells 28 can be provided by the storage substrate 10, with six such storage cells 28 shown in FIG. 1 for purposes of illustration. In each storage cell 28, the tip 22 of a probe 14 can cause formation of a dent 30, which is basically a pit or hole that is formed into the storage surface 12. In the arrangement of FIG. 1, a first probe 14 is used to interact with storage cells 28 along a first column (36A), whereas a second probe 14 is used to interact with storage cells 28 along a second column 36B. In the first column 36A, one of the storage cells 28 has a dent formed in the storage cell, while the other two illustrated storage cells do not have dents. In the second column 36B, dents 30 are formed in two of the storage cells 28, with no dent formed in the other storage cell 28. As illustrated in FIG. 1, the tip 22 of the probe 14 in the first column 36A is engaged in a dent 30 of a storage cell 28, whereas the tip 22 of the probe 14 in the second column 36B is engaged on the storage surface 12 but not in a dent.

The presence of a dent 30 represents a first storage state (e.g., logical "1"), while the absence of the dent represents a second storage state (e.g., logical "0"). To write to the storage medium, a probe 14 is scanned across the storage surface 12, with the probe tip 22 heated and contacted to corresponding positions on the storage surface 12 to form corresponding dents 30.

To read from the storage medium, each probe 14 is also scanned across the storage surface 12. Detection of whether a dent is present or not in a storage cell is based on a measured capacitance value associated with the capacitances formed by the plates 24, 26, 32, and 34 of a probe 14. If the tip 22 of the probe 14 is engaged in a dent 30 of a storage cell (such as the position of the probe in column 36A), then the plates 24, 26 on the probe 14 are in closer proximity to respective plates 32, 34 (assuming the plates 32, 34 are positioned below the probe plates 24, 26). As a result, the plates 24, 26, 32, and 34 are associated with a first capacitance value. However, if the tip 22 of the probe 14 is not engaged in a dent, which is the position of the probe in column 36B, then the plates 24, 26 on the probe are farther spaced apart from the respective plates 32, 34. Therefore, a second, lower capacitance value is associated with the capacitances formed by the plates 24, 26, 32, and 34.

Figure 2:
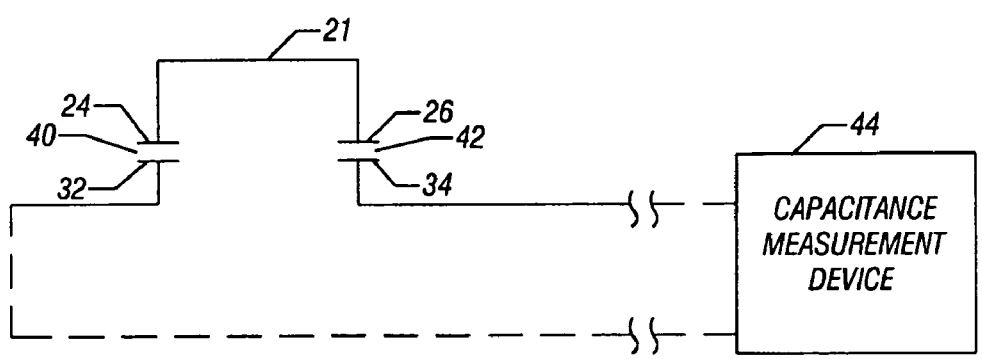
FIG. 2 is a circuit diagram of a capacitance sensor coupled to variable capacitances provided in part by a probe in the storage device of FIG. 1.

A circuit representation of the capacitances formed by the plates 24, 26 and plates 32, 34 is depicted in FIG. 2. The plates 24 and 32 form a first capacitance 40, while the plates 26 and 34 from a second capacitance 42. The plates 24 and 26 are electrically connected by the trace 21. The plates 32 and 34 are electrically connected to a capacitance measurement device 44. The capacitances 40 and 42 are connected in parallel and form an overall capacitance that is measured by the capacitance measurement device 44. The capacitance value measured by the capacitance measurement device 44 varies based on whether or not a corresponding probe 14 is engaged in a dent. Multiple capacitance measurement devices 44 are associated with multiple respective probes 14. In effect, the overall capacitance provided by the capacitances 40 and 42 is a variable capacitance whose capacitance value varies depending upon whether a dent is present or not in a storage cell.

In a different embodiment, instead of having two sets of plates 24, 26 and 32, 34, one set of plates is used to provide one capacitance (instead of the two capacitances 40 and 42 depicted in FIG. 2). Alternatively, more plates can be provided to define more than two capacitances.

Figure 3:
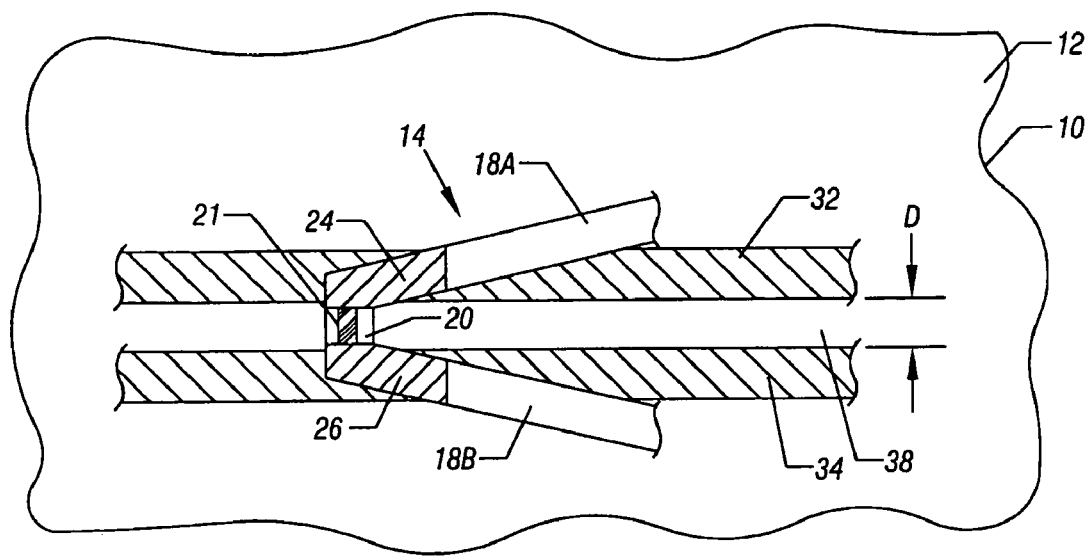
FIG. 3 is a top view of a probe positioned over a storage substrate, in accordance with an embodiment of the invention

FIG. 3 is a top view of a probe 14 arranged over the storage surface 12 of the storage substrate 10. In this arrangement, the plate 32 is provided generally below the plate 24 of the probe 14, and the plate 34 is provided generally below the plate 26 of the probe 14. The plates 32, 34 can be provided above the surface 12, or underneath a layer of a storage substrate 10. The plates 32 and 34 are laterally spaced apart by a distance indicated by D so that a gap 38 is provided between the plates 32 and 34. The probe tip 22 (FIG. 1) is able to form dents in the portion of the storage surface 12 exposed by the gap 38 between the plates 32 and 34.

Figure 4:
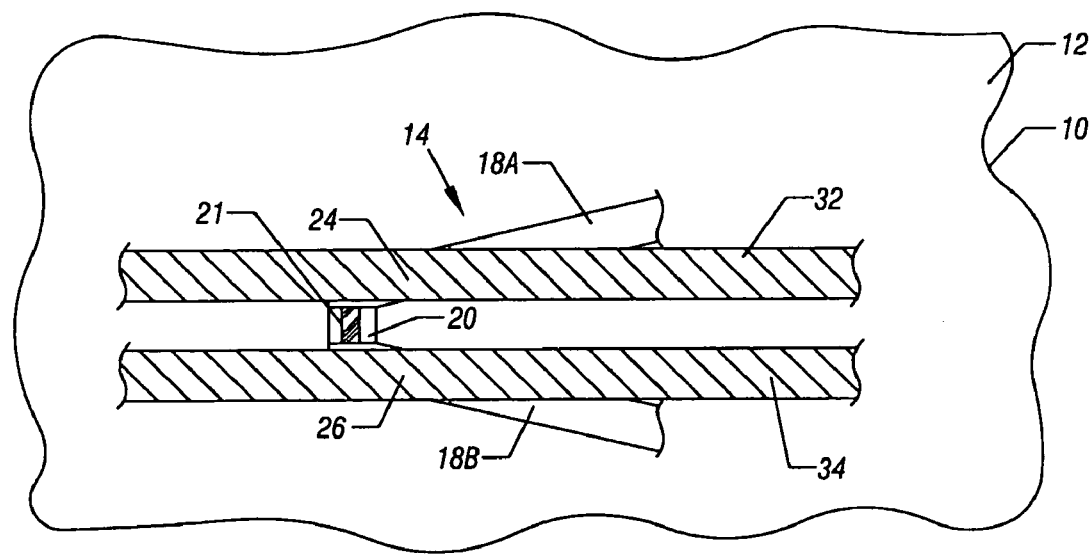
FIG. 4 is a top view of another embodiment of the invention.

FIG. 4 illustrates another embodiment, in which the plates 32, 34 are provided above the probe 14. In this arrangement, the probe 14 is between the plates 32, 34 and the storage surface 12.

The embodiments of FIGS. 3 and 4 differ in operation. In the FIG. 3 embodiment, the plates 24, 26 of the probe 14 become closer to the plates 32, 34 in response to the probe tip 22 (FIG. 1) being engaged in a dent. On the other hand, in the FIG. 4 embodiment, the plates 24, 26 of the probe 14 become farther spaced apart from the plates 32, 34 in response to the probe tip 22 (FIG. 1) being engaged in a dent.

Referring to FIG. 1, to create a dent during a write operation, the tip 22 of a probe is locally heated to a predetermined temperature (e.g., up to about 400° C. or greater) for some amount of time. The heat on the tip 22 melts the storage surface 12 at the contact point of the tip 22. When a downward force is applied onto the probe 14, the tip 22 imprints the dent 30. The applied downward force can be an incremental, applied downward force, or alternatively, a constant downward force due to the elastic nature of the cantilever 18. For example, the storage device can be assembled such that the cantilever 18 of each probe is bent back a little and thus applies constant force on the storage surface 12.

To enable formation of the dent in the storage surface 12, at least a layer of the storage substrate 10 that is adjacent the storage surface 12 is formed of a relatively soft material. In one implementation, the material includes a polymer such as polymethylmethacrylate (PMMA), or other suitable material.

Once a dent is formed, the dent can be erased by also using the probe tip 22. During erase, the tip 22 engages the dent 30, with the tip 22 being heated locally to melt the material surrounding the dent 30 such that the material flows into the dent 30 to remove the dent. Alternatively, instead of using the tip 22 to erase a dent, local heat source(s) can be provided underneath the storage medium in the storage substrate 10, with the heat source(s) heated to melt the materials surrounding dent(s) to reflow material back into the dent(s). Examples of such local heat sources include resistors or other heating elements.

Figure 5:
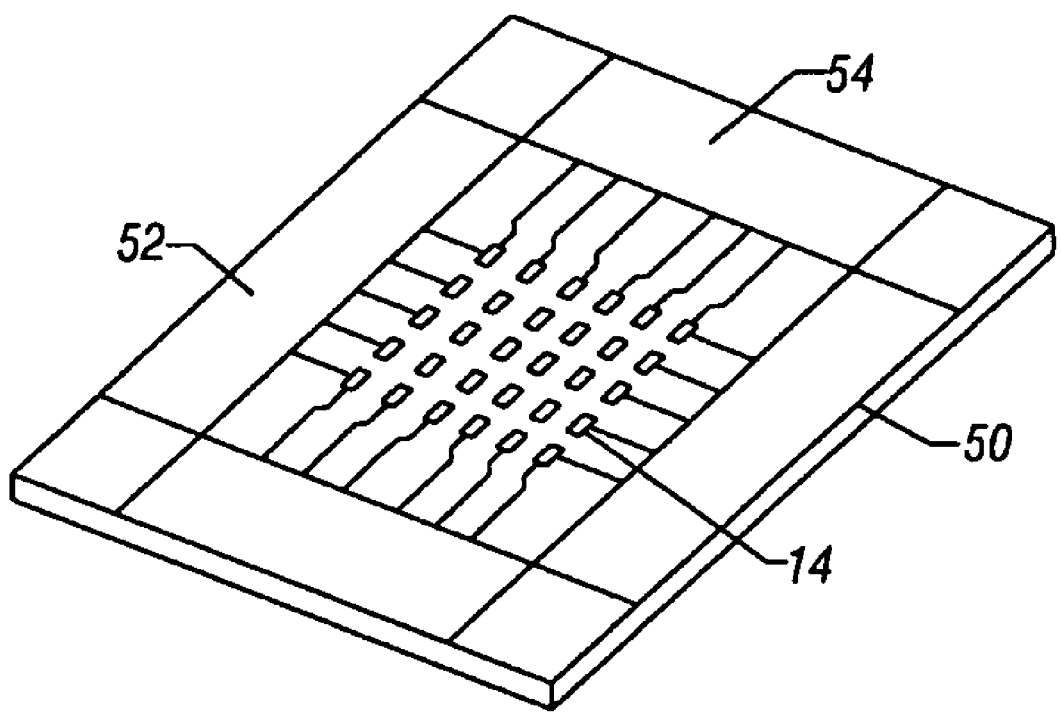
FIG. 5 is a schematic diagram of a probe substrate containing an array of probes and peripheral circuitry to interact with such probes in the storage device of FIG. 1.

FIG. 5 illustrates a probe substrate 50 that includes an array of probes 14 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 14 may be activated by the select lines to read from or write to storage cells that the probes are in contact with. This structure enables concurrent access of multiple cells in one operation, which improves access speeds. Alternatively, one of the probes may be activated to read from or write to one storage cell. The peripheral circuitry 52 or 54 also includes the capacitance measurement devices 44 (FIG. 2) for measuring variable capacitances associated with corresponding probes 14. Decoders are also provided in the peripheral circuitry 52 or 54 to decode measurement signals from the capacitance measurement devices 44 into digital representations of logical "0" or logical "1."

Figure 6:
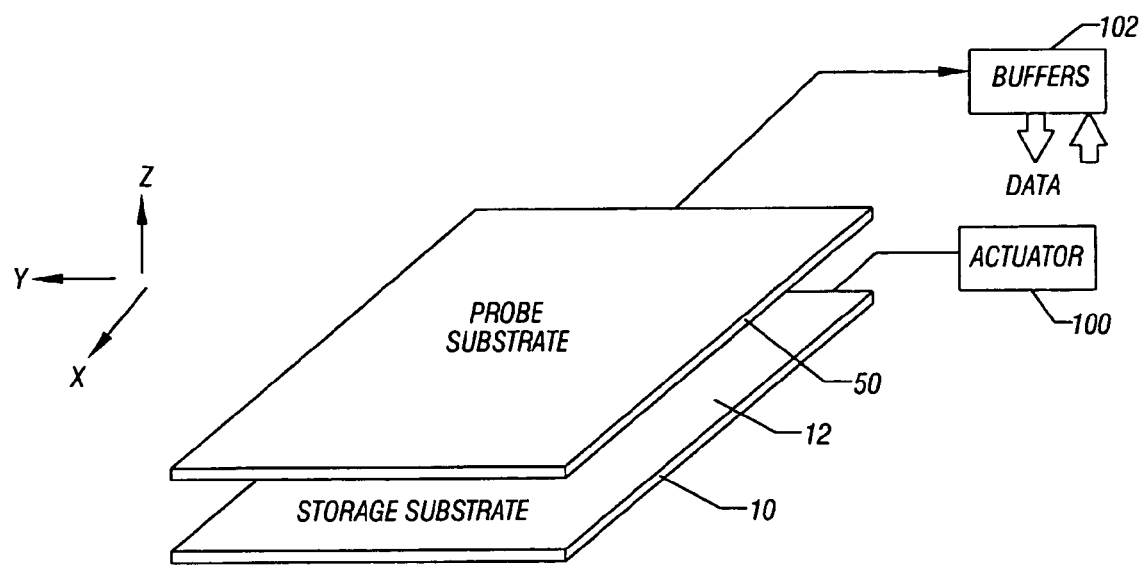
FIG. 6 illustrates the probe substrate positioned to face the storage substrate in the probe-based storage device of FIG. 1.

As shown in FIGS. 1 and 6, the probe substrate 50 is placed with the surface containing the probes 14 facing the storage surface 12 of the storage substrate 10, on which the storage cells are formed. The probe substrate 50 is positioned over the storage substrate 10 so that the probe tip 22 (FIG. 1) of each probe 14 points downwardly to engage the storage surface 20 of the storage substrate 10. In an alternative arrangement, the storage substrate 10 is positioned over the probe substrate 50 so that the probe tip 22 points upwardly to face the storage surface 12. In other arrangements, the probe substrate 50 and the storage substrate 10 can have a lateral or diagonal relationship.

The storage substrate 10, in the example of FIG. 6, is coupled to an actuator 100 that is designed to move the storage substrate 10 in both X and Y directions such that probes 14 (FIG. 1) can be placed over desired storage cells on the storage substrate 10. Data sensed by the probes 14 is provided to buffers 102, which store output data for retrieval by an external device. The buffers 102 may also store write data to be written to storage cells 28 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 7:
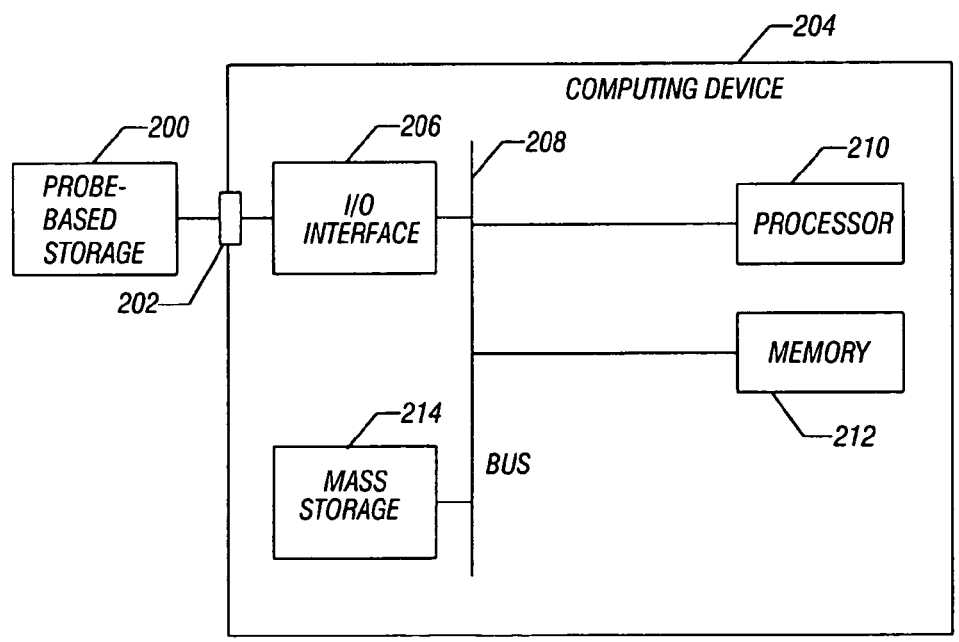
FIG. 7 is a block diagram of a system that includes a computing device having a port to connect to a probe-based storage device according to FIG. 1.

The probe-based: storage device can be packaged for use in a computing system. For example, as shown in FIG. 7, a probe-based storage device 200 that incorporates the variable capacitance detection mechanism according to some embodiments is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 218. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a probe having a tip and a first plate;
   a storage medium,
   the tip of the probe adapted to form a dent in the storage medium to represent a state of data bit; and
   a second plate,
   wherein the first plate and second plate cooperate to provide a variable capacitance that varies between different capacitance values depending on whether the tip of the probe is engaged in the dent.

2. The storage device of claim 1, further comprising a gas between the first and second plates, the gas forming a dielectric of the variable capacitance.

3. The storage device of claim 1, wherein a layer of the storage medium forms at least a part of the dielectric of the variable capacitance.

4. The storage device of claim 1, wherein the first and second plates are separated by a first distance in response to the tip of the probe being in the dent, and
   wherein the first and second plates are separated by a second, different distance in response to the tip of the probe being engaged on a surface of the storage medium but not in the dent.

5. The storage device of claim 4, wherein the variable capacitance has a first capacitance value in response to the first and second plates being separated by the first distance, and wherein the variable capacitance has a second capacitance value in response to the first and second plates being separated by the second distance.

6. The storage device of claim 5, further comprising a measurement device to measure a value of the variable capacitance during a read operation.

7. The storage device of claim 6, wherein the tip is heatable to an elevated temperature to form the dent during a write operation.

8. The storage device of claim 7, further comprising storage cells in the storage medium, the tip of the probe adapted to selectively form dents in respective storage cells to represent states of corresponding data bits.

9. The storage device of claim 8, wherein presence of a dent in a storage cell represents a first logical state of a corresponding data bit, and absence of a dent in a storage cell represents a second logical state of a corresponding data bit.

10. The storage device of claim 1, wherein the variable capacitance comprises a first variable capacitance, and wherein the probe has a third plate electrically connected to the first plate,
   the storage device further comprising a fourth plate spaced apart from the third plate,
   wherein the third plate and fourth plate cooperate to provide a second variable capacitance that varies between different capacitance values depending on whether the tip of the probe is engaged in the dent.

11. The storage device of claim 10, wherein the first and second variable capacitances are arranged in parallel, the storage device further comprising a capacitance measurement device to measure an overall capacitance provided by the first and second variable capacitances.

12. The storage device of claim 10, wherein the storage medium is between the probe and a plane containing the second and fourth plates.

13. The storage device of claim 10, wherein the probe is between the storage medium and a plane containing the second and fourth plates.

14. The storage device of claim 1, wherein the storage medium is between the probe and the second plate.

15. The storage device of claim 1, wherein the probe is between the second plate and the storage medium.

16. A system comprising:
a processor; and
a storage device comprising:
 a probe having a tip and a first plate;
 a storage medium,
 the tip of the probe to form a dent in the storage medium during a write operation; and
 a second plate spaced apart from the first plate,
 wherein the first plate and the second plate cooperate to provide a variable capacitance that varies between different capacitance values depending on whether the tip of the probe is engaged in the dent.

17. The system of claim 16, wherein the storage device further comprises circuitry to measure a value of the variable capacitance to detect a storage state.

18. The system of claim 16, wherein the first and second plates are separated by a first distance in response to the tip of the probe being in the dent, and
wherein the first and second plates are separated by a second, different distance in response to tip of the probe being on a surface of the storage medium but not in the dent.

19. The system of claim 16, wherein the storage device further comprises:
a second probe having a tip and a third plate, the tip of the second probe adapted to form a second dent in the storage medium; and
a fourth plate spaced apart from the third plate,
wherein the third plate and fourth plate cooperate to provide a variable capacitance that varies between different values depending on whether the tip of the second probe is engaged in the second dent.

20. The system of claim 16, wherein the storage medium comprises a plurality of storage cells, wherein the tip of the probe is adapted to program a first one of the storage cells by forming a dent in the first storage cell, and to program a second one of the storage cells by not forming the dent in the second storage cell.

21. The system of claim 16, wherein the probe comprises a nanotechnology probe.

22. A method of reading data in a storage device, comprising:
scanning a probe over a storage medium having dents formed in the storage medium, wherein the probe has a tip and a first plate;
engaging the tip of the probe at a first position on the storage medium such that the tip engages a dent, wherein the first plate of the probe cooperates with a spaced apart second plate to form a first capacitance at the first position; and
positioning the probe at a second, different position on the storage medium such that the tip of the probe is not engaged in a dent, wherein the first plate and the spaced apart second plate cooperate to form a second capacitance at the second position, the second capacitance being different from the first capacitance.

23. The method of claim 22, wherein the first plate and the second plate cooperate to form a variable capacitance, the method further comprising:
measuring a value of the variable capacitance.

24. The method of claim 23, wherein measuring the value of the variable capacitance is performed with a measurement device, the measurement device measuring a first capacitance value in response to the tip of the probe being engaged in a dent, and the measurement device measuring a second capacitance value in response to the tip of the probe not being engaged in a dent.

25. The method of claim 24, further comprising detecting one of the first capacitance value and the second capacitance value during a read operation.

26. The method of claim 25, further comprising using the tip of the probe to form the dents during a write operation.

* * * * *